Feb. 12, 1952 D. S. WILLSON 2,585,362
MEANS FOR EFFECTING CALIBRATION OF THE TIRE
INFLATOR SPRING OF TIRE INFLATING APPARATUS
Filed Oct. 29, 1947 3 Sheets-Sheet 3
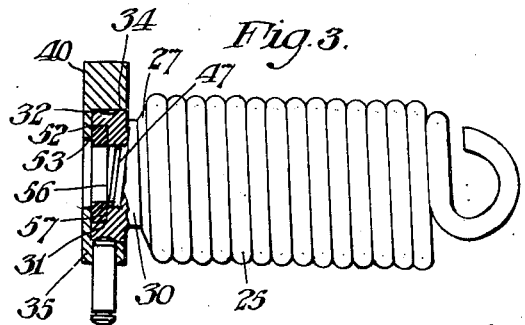
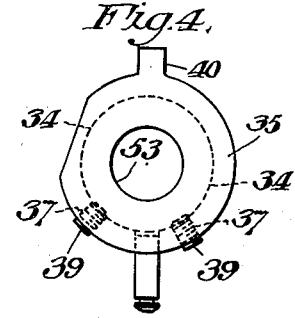
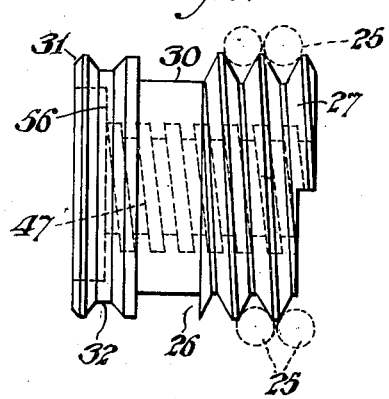
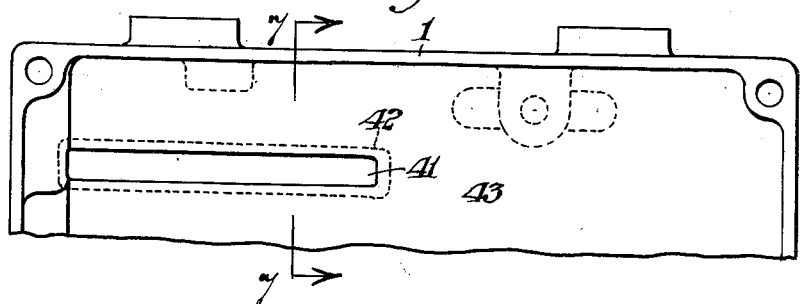
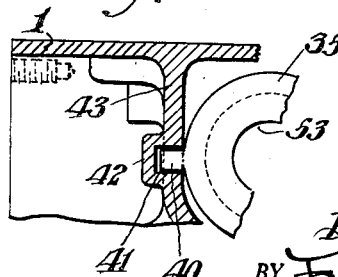
INVENTOR:
David S. Willson
BY
ATTORNEY.

Patented Feb. 12, 1952

2,585,362

UNITED STATES PATENT OFFICE 2,585,362

MEANS FOR EFFECTING CALIBRATION OF THE TIRE INFLATOR SPRING OF TIRE INFLATING APPARATUS

David S. Willson, Muskegon Heights, Mich., assignor to John Wood Manufacturing Company, Inc., Philadelphia, Pa., a corporation of Delaware Application October 29, 1947, Serial No. 782,810

4 Claims. (Cl. 267—1)

My invention relates to improvement in means for effecting calibration of the inflator spring of tire inflating apparatus which is adaptable for charging an air receiver to a predetermined pressure. My invention is particularly adaptable for use, for example, in tire inflating apparatus of the type disclosed in my co-pending application Serial No. 630,674 filed November 24, 1945, by Joseph C. Woodford and myself for Improvement in Fluid Dispensing Apparatus; the type of apparatus disclosed in Letters Patent of the United States No. 2,162,474 granted June 13, 1939, to Virgil D. Barker; etc.

My invention may be embodied with particular advantage in apparatus used in automobile service stations for inflating the tires of motor vehicles to a predetermined pressure. It is ordinary practice in service stations to highly compress air, say from 100 to 150 pounds per square inch, by a compressor operated by an electric motor, and to store such highly compressed air in a supply tank from which it may be released through tire inflating dispensing apparatus which is adjustable to predetermine the pressure to which any air receiver may be charged.

During assembling of the apparatus, the apparatus is calibrated so that it will automatically inflate tires accurately to the pressure for which the apparatus is set selectively by the operator. The pressure setting is indicated visibly on a series of number wheels having on their circumferences a series of numbers from 1 to 9 inclusive and zero; or is indicated visibly on a flat dial by a pointer hand; etc.

Calibration of the apparatus is effected by adjustment of the effective length of the main inflating spring, one end of which is operatively connected to the main lever of the apparatus. As said main inflating springs are manufactured in quantity production, there may be slight variations in the effective stresses of the springs for a given length of spring. Hence, it is highly desirable that means be provided in the apparatus by which the required adjustment of the effective length of the spring may be made facilely in calibrating of the apparatus.

One feature of my invention is that minute adjustments of the effective length of the main inflating spring may be made, which permits of greater accuracy of the apparatus.

Another feature of my invention is that adjustments of the effective length of the main inflating spring may be made more facilely.

Another feature of my invention is that means are provided to maintain the outer adjusting member in non-rotatable position in the casing of the apparatus, with the cooperating inner nut selectively rotatable through any number of degrees of rotation as may be necessary to effect the required adjustment.

My invention includes the various novel features of construction and arrangement hereinafter more definitely specified.

In said drawings; Fig. 1 is an elevation of my invention as embodied in a tire inflating apparatus, but with the cover of the apparatus omitted.

Fig. 3 is a plan view, partly in section, of the inflator spring assembly.

Fig. 4 is a left-hand end elevation of the structure shown in Fig. 3.

Fig. 5 is an elevation, on an enlarged scale, of the adjusting nut indicated in Fig. 3.

Fig. 6 is a fragmentary elevation of the portion of the casing in which the inflator spring assembly is mounted in cooperative relationship.

Fig. 7 is a fragmentary vertical sectional view of the casing shown in Fig. 6, taken on the lines 7—7 in Fig. 6.

Figure 1:
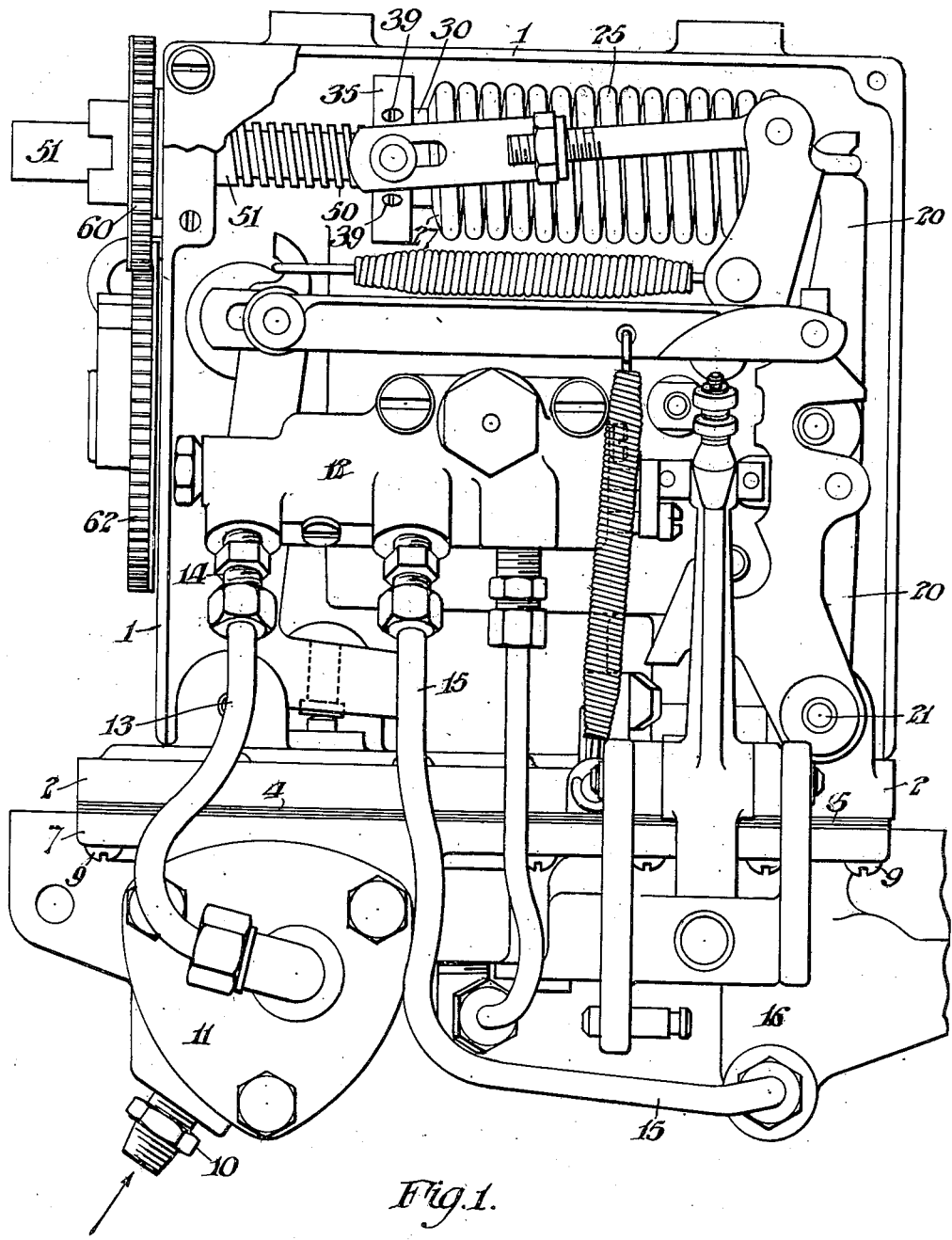

A full and detailed description of the general operation of the tire inflating apparatus herein shown is set forth in my said co-pending application Serial No. 630,674. My present invention relates only to means for calibrating the inflator spring of such a type of apparatus, and my present invention may be understood fully without including herein a detailed description of the operation of the tire inflating mechanism per se which forms no part of my present invention.

Referring to said drawings, the reference mark 1 indicates the outer casing of an inflating apparatus which is adaptable for charging an air receiver, such as an automobile tire, to a predetermined pressure. The apparatus indicated is of the type which operates over a wide range of pressure adjustments, and operates in controlled cycles of pulsating charges of air to the receiver, each charge of air being terminated at a short interval after it is initiated. Said casing 1 has a bottom wall 2 attached thereto by means of screws 3. Flexible diaphragms 4 and 5 are clamped between said bottom wall 2 and the diaphragm cover plate 7 by means of a series of screws 9 which extend through openings in the periphery of the cover 7 and diaphragms 4 and 5 into screw threaded openings in the bottom wall 2. Said diaphragms 4 and 5 form fluid tight seals around the peripheries of the diaphragm chambers formed in said cover plate 7.

A supply source of air under high pressure is connected by suitable piping to the inlet fitting 10 of the strainer 11 of the apparatus. The supply of air under high pressure, after passing through the strainer 11, is connected to the valve casing 12 through the inlet conduit 13 and inlet conduit fitting 14. The conduit 15 connects the valve casing 12 with the fitting 16, the right-hand side of which is adapted to be connected with a fluid service conduit of the well known construction which has at the distal end thereof an air valve chuck for attachment to the valve stem of an automobile tire. Such air chucks are well known in the art and include a valve which closes to prevent air escaping from the hose when the chuck is not attached to a tire stem, but which valve is opened and automatically unseats the tire valve when the chuck is applied to the tire valve stem. The fitting 16 is provided with a passageway in communication with the inflator diaphragm chamber.

The inflator diaphragm 5 is provided with a diaphragm plunger which rests upon the upper surface of the diaphragm 5, and said plunger has an upwardly extending stem which is in cooperative relation with the short arm of the bell crank main inflator lever 20 which is pivotally mounted on the fulcrum pin 21.

As best shown in Fig. 1, the inflator spring 25 is operatively connected at its right-hand end to the upper end of the main lever 20.

As best shown in Figs. 5 and 3, the inflator spring adjusting nut member 26 is provided at its right-hand end portion with an external screw thread 27 which is adapted to be screwed into the nut-like opening of the spring 25. With the spring 25 not under stress, the convolutions of the spring 25 form a nut-like internal opening therein, and the pitch diameter and form of the screw thread 27 is such that the right-hand end of the member 26 may be screwed into the spring 25. The member 26 is provided, conveniently, with an intermediate reduced diameter portion 30, and enlarged diameter portion 31 at its left-hand end, as viewed in Fig. 5. Said enlarged diameter portion 31 is provided with an external annular groove 32, and said enlarged diameter portion 31 is adapted to be engaged in the annular recess 34 formed at the right-hand portion of the outer locking ring member 35.

The ring member 35 is provided with the radial screw threaded openings 37 therethrough for set screws 39 adapted to be seated in locking engagement in the groove 32 to prevent relative turning movement between the ring member 35 and the inflator spring adjusting nut member 26 after the member 26 has been screwed into proper position in the spring 25. The ring member 35 has the external lug 40 adapted to be slidably engaged in the recess 41 of the offset portion 42 formed in the middle wall 43 of the casing 1. After the set screws 39 have been seated in the groove 32, the lug 40 engaged in the recess 41 prevents rotation of the ring member 35, member 26, and spring 25 to assure that the stresses of the spring 25 remain constant as calibrated.

The inflator spring adjusting nut member 26 is provided with the axial screw threaded opening 47 therethrough which is in screw threaded engagement with the adjusting screw 50 which, conveniently, is cut on the shaft 51, the left-hand end of which extends exterior to the casing 1. The web 52 formed at the left-hand side of the ring member 35 is provided with the axial opening 53 therethrough of greater diameter than the diameter of the shaft 51 to permit the shaft 51 to be inserted through, and turned freely in, the ring member 35. I find it convenient to form an axial annular recess 56 at the left-hand side of the inflator spring adjusting nut member 26 for a felt oiler 57 for lubrication of the shaft 51. The felt oiler 57 is retained in position by engagement with the inner face of the web 52 of the ring member 35.

The left-hand end of the shaft 51 is provided with a crank handle (not shown) by which said spring 25 may be adjusted selectively by the operator of the inflating apparatus. The stresses of said spring 25 may be increased by turning the shaft 51 clockwise, or decreased by turning said shaft 51 counterclockwise. Said shaft 51 is journalled at its left-hand end portion in a bearing which is press fitted in an opening formed in the main casing 1. Any convenient means may be provided to prevent the shaft 51 from axial displacement in its bearing.

The shaft 51 is connected with indicating means for manifesting in pounds the pressure of the fluid to be dispensed and for which the spring 25 has been manually adjusted by the operator by rotation of the crank on the shaft 51. Such means include the gear 60 which is rigidly mounted on the shaft 51. Said gear 60 meshes with the gear 62 which is rigidly mounted on the indicator wheel shaft 63, as best shown in Fig. 2.

Figure 2:
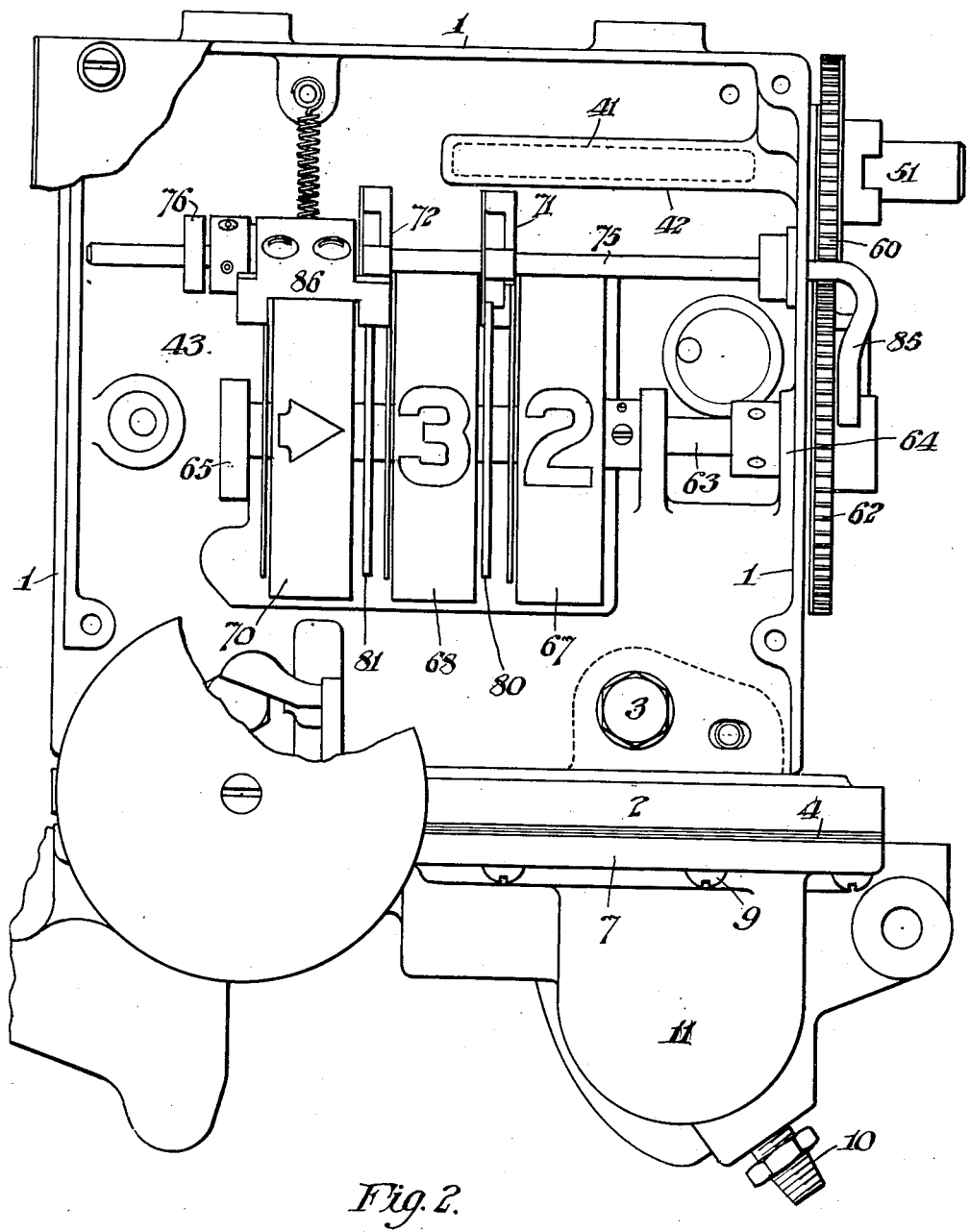
Fig. 2 is an elevation of the opposite side of the apparatus shown in Fig. 1.

Referring to Fig. 2; the right-hand end of the shaft 63 is journalled in a bearing 64 formed in the wall of the main casing 1, and the left-hand end of said shaft 63 is journalled in the bearing 65 which, conveniently, is formed as a lug on the wall 43 of the casing 1. Said shaft 63 has connected therewith the number wheel 67 which has on its circumference a series of numbers from 1 to 9 inclusive, and zero. Said wheel 67, which indicates individual pounds, is connected by tens-transfer gearing with the similarly numbered wheel 68, each of the numbers on which represent 10 pounds. Said intermediate wheel 68 is operatively connected with the similarly numbered wheel 70, each of the numbers on which represent 100 pounds. I find it convenient to use an arrowhead in lieu of the zero on the wheel 70 to avoid any confusion with respect to the setting of the apparatus at pressures below 100 pounds.

A connection between the number wheels is conveniently effected by respective transfer pinions 71 and 72 which are loosely journalled on the shaft 75. The right-hand end of said shaft 75 is mounted in the side wall of the casing 1 and the left-hand end of said shaft 75 is mounted in the bracket 76. Said pinions 71 and 72 are turned intermittently by respective sectoral gears 80 and 81 in the well known manner of operation of tens-transfer mechanisms and by which, upon a complete rotation of the successive numbered wheels of lower order, the wheel of next higher order is turned one-tenth of a revolution.

As indicated by the dials in Fig. 2, the screw shaft 51 has been adjusted manually to assure dispensation of compressed air through the service conduit to charge an automobile tire, or other receiver, with a fluid pressure of 32 pounds per square inch. For convenience, I have omitted the showing of any of the numbers which appear upon the peripheries of the wheels 67, 68, and 70 except the number "3" on the wheel 68, the number "2" on the wheel 67, and the arrow on the wheel 70.

The means shown herein for locking the dial wheels of the inflating mechanism, including the locking member 85, locking pawl 86, etc. are claimed in my co-pending application Serial No. 698,675 filed September 23, 1946 now Patent Number 2,547,741, issued April 3, 1951.

*Operation*

The tire inflating apparatus shown is assembled with the inflator spring adjusting nut member 26 screwed into the convolutions of the spring 25 the distance which would assure accuracy of operation of the apparatus if the spring had the exact characteristics required. The apparatus is then calibrated as follows: the apparatus is operated to inflate an air receiver at some pressure setting, say, 32 pounds, as is indicated on the dials in Fig. 2. After the apparatus has ceased functioning which, if the machine be calibrated accurately, would indicate that the air receiver had been inflated to the pressure indicated on the dial setting, the air chuck is removed from the tire stem of the air receiver, and the actual pressure in the air receiver is checked with a master gauge.

If the reading on the master gauge indicates that the receiver has been inflated to the set pressure of 32 pounds, or to within the desired plus or minus limits of such set pressure, the tire inflating apparatus then is tested at the high end of its range, say, 100 pounds, as hereinafter described. However, if with a dial setting of 32 pounds, a check reading with a master gauge indicates that the actual pressure in the air receiver is, say, 35 pounds or, say, 28 pounds, the gears are unmeshed and the dial moved to a setting corresponding to the actual pressure in the receiver as indicated by the master gauge, and the gears again engaged.

With the dial and spring coordinated at a comparatively low range setting, the apparatus is then set to a high dial reading of, say, 100 pounds, to determine whether the apparatus is accurate throughout the range of pressures for which the apparatus is used. With a dial setting of 100 pounds, the apparatus is then again operated to inflate an air receiver and, after the apparatus has ceased functioning, the actual pressure in the air receiver is again checked with the master gauge. If the master gauge reading is, say, 96 pounds, or below the set pressure, it indicates that the main spring 25 is not sufficiently "stiff," and the effective length of the spring 25 needs to be shortened by screwing the member 26 into the spring 25. On the contrary, if in such second testing at a set pressure of 100 pounds, the actual pressure in the receiver be found to be 103 pounds, this indicates that the main spring is too stiff and the member 26 would be turned to unscrew it in the spring 25 to the proper estimated amount.

The calibration of the device by the setting of the main spring 25 on the member 26 is more or less a matter of trial and error, and experience soon guides the workman as to about how much the spring should be moved on the member 26 to bring the apparatus into proper calibration throughout its operating range.

At the ring member 35 may be moved to any position with respect to the circumference of the member 26 when the set screws 39 are loosened, the ear 40 may be readily aligned to the same plane as the hook end of the spring 25 (the right-hand end in Fig. 1), and the screws 39 again tightened. Accordingly, with the hook end of the spring 25 in a horizontal plane when engaging the upper end of the lever 20, the lug 40 may be properly positioned in the recess, or slot, 41 to move back or forth freely in a horizontal plane in the slot 41, and at the same time prevent rotation of the ring member 35, member 26 and spring 25 to assure that the stresses of the spring 25 remain constant, as calibrated.

In the prior art calibrating means, the adjustable plug or nut is held against rotation by a pin in fixed relation to the adjusting nut. Accordingly, when any calibrating adjustment of the nut is made, it is necessary to drill a new hole for the pin, and reposition the pin. If the calibrating adjustment involved the rotation of the nut but a limited number of degrees, it is obvious that there would be an overlapping of the holes for the pin and consequent difficulty in positioning the pin rigidly in the nut, or in a collar formed integrally on the nut.

In my improved calibrating means, the pin or lug 40 remains in fixed position with respect to the circumference of the collar 35, and the member 26 may be turned a very limited number of degrees, or a complete revolution or revolutions, without requiring any modification in the pin or a lug setting, and the lug 40 will remain slidably mounted in the slot or recess 41.

However, I do not desire to limit myself to the specific details of construction and arrangement herein set forth, as it is obvious that various modifications may be made therein without departing from the essential features of my invention as defined in the appended claims.

I claim:

1. Calibrating means for inflating apparatus, which apparatus includes an outer casing support and a main lever pivotally mounted in said outer casing support, comprising an inflator spring connected at one end to said main lever; an adjusting nut member having an external screw threaded portion in cooperative engagement with the inner surface of the convolutions of said inflator spring throughout a portion of the length of said inflator spring; means for connecting said adjusting nut member to said casing support; a guide slot in said casing support; a non-rotatable locking ring member, including a lug in sliding engagement in said guide slot, to which said adjusting nut member is rotatably connected; and clamping means selectively connecting said adjusting nut member in rigid relationship with said non-rotatable member.

2. Calibrating means for inflating apparatus, which apparatus includes an outer casing support and a main lever pivotally mounted in said outer casing support, comprising an inflator spring connected at one end to said main lever; an adjusting screw shaft journalled at one end in said outer casing support; an adjusting nut member having an external screw threaded portion in cooperative engagement with the inner surface of the convolutions of said inflator spring throughout a portion of the length of said inflator spring, said adjusting nut member also having an internal screw threaded portion cooperatively engaged by said adjusting screw shaft; a guide slot in said casing support; a non-rotatable locking ring member, including a lug in sliding engagement in said guide slot, to which said adjusting nut member is rotatably connected; clamping means selectively connecting said adjusting nut member in rigid relationship with said non-rotatable member; and lubricating means clamped between said non-rotatable member and said adjusting nut member for lubricating said adjusting screw.

3. In calibrating means for inflating apparatus; the combination with a casing support for the apparatus; of a main lever pivotally mounted in said outer casing support; an inflator spring operatively connected to said main lever; an adjusting screw shaft journalled at one end in said outer casing support; an adjusting nut member having a screw threaded portion in cooperative engagement with the convolutions of said inflator spring throughout a portion of the length of said inflator spring, said adjusting nut member also having an internal screw threaded portion cooperatively engaged by said adjusting screw shaft; a guide slot in said casing support; a non-rotatable locking ring member, including a lug in sliding engagement in said guide slot, to which said adjusting nut member is rotatably connected; and means selectively connecting said adjusting nut member in rigid relationship with said non-rotatable member.

4. In calibrating means for inflating apparatus; the combination with a casing support for the apparatus; of a main lever pivotally mounted in said outer casing support; an inflator spring operatively connected to said main lever; an adjusting screw shaft journalled at one end in said outer casing support; an adjusting nut member having a screw threaded portion in cooperative engagement with the convolutions of said inflator spring throughout a portion of the length of said inflator spring, said adjusting nut member also having an internal screw threaded portion cooperatively engaged by said adjusting screw shaft; a guide slot in said casing support; a non-rotatable locking ring member, including a lug in sliding engagement in said guide slot, to which said adjusting nut member is rotatably connected; means selectively connecting said adjusting nut member in rigid relationship with said non-rotatable member; and lubricating means clamped between said non-rotatable member and said adjusting nut member for lubricating said adjusting screw.

DAVID S. WILLSON.

REFERENCES CITED

The following references are of record in the file of this patent:

UNITED STATES PATENTS

| Number | Name | Date |
|---|---|---|
| 1,023,490 | Beck et al. | Apr. 16, 1912 |
| 2,170,744 | Adler | Aug. 22, 1939 |
| 2,316,626 | Rothwell | Apr. 13, 1943 |

FOREIGN PATENTS

| Number | Country | Date |
|---|---|---|
| 320,266 | France | Aug. 13, 1902 |